United States Patent

[11] 3,552,385

| [72] | Inventor | Frits Jacques Janssen<br>Emmasingel, Eindhoven, Netherlands |
|---|---|---|
| [21] | Appl. No. | 718,997 |
| [22] | Filed | Apr. 5, 1968 |
| [45] | Patented | Jan. 5, 1971 |
| [73] | Assignee | U. S. Philips Corporation<br>New York, N.Y.<br>a corporation of Delaware. by mesne assignment |
| [32] | Priority | Apr. 13, 1967 |
| [33] | | Netherlands |
| [31] | | No. 6705195 |

[54] DEVICE FOR MEASURING BLOOD PRESSURE
7 Claims, 2 Drawing Figs.

[52] U.S. Cl. .................................................. 128/2.05
[51] Int. Cl. .................................................. A61b 5/02
[50] Field of Search ............................................
128/2.05AS, C, M, MS, P, PR, R, SPH, V, 2.1

[56] References Cited
UNITED STATES PATENTS

| 2,944,542 | 7/1960 | Barnett et al. .................. | 128/2.05 |
| 3,095,872 | 7/1963 | Tolles.......................... | 128/2.05 |
| 3,118,440 | 1/1964 | DeNobbeleer ............... | 128/2.05 |
| 3,156,237 | 11/1964 | Edmark, Jr. ................... | 128/2.05 |
| 3,348,534 | 10/1967 | Marx et al.................... | 128/2.05 |

*Primary Examiner*—William E. Kamm
*Attorney*—Frank R. Trifari

ABSTRACT: A device for measuring blood pressure comprising two outer electrodes and a central electrode pressed against an artery by an inflatable pressure cuff. High frequency energy is supplied to the outer electrodes. Voltage pulses are produced between each outer electrode and the central electrode and are compared in a difference amplifier to produce an output voltage determined by the phase shift therebetween. A threshold discriminator having a variable threshold voltage determined by the peak value of the input voltage is coupled to the output of said difference amplifier and operates a pressure valve relay when the amplifier output voltage falls below the threshold voltage.

PATENTED JAN 5 1971
3,552,385
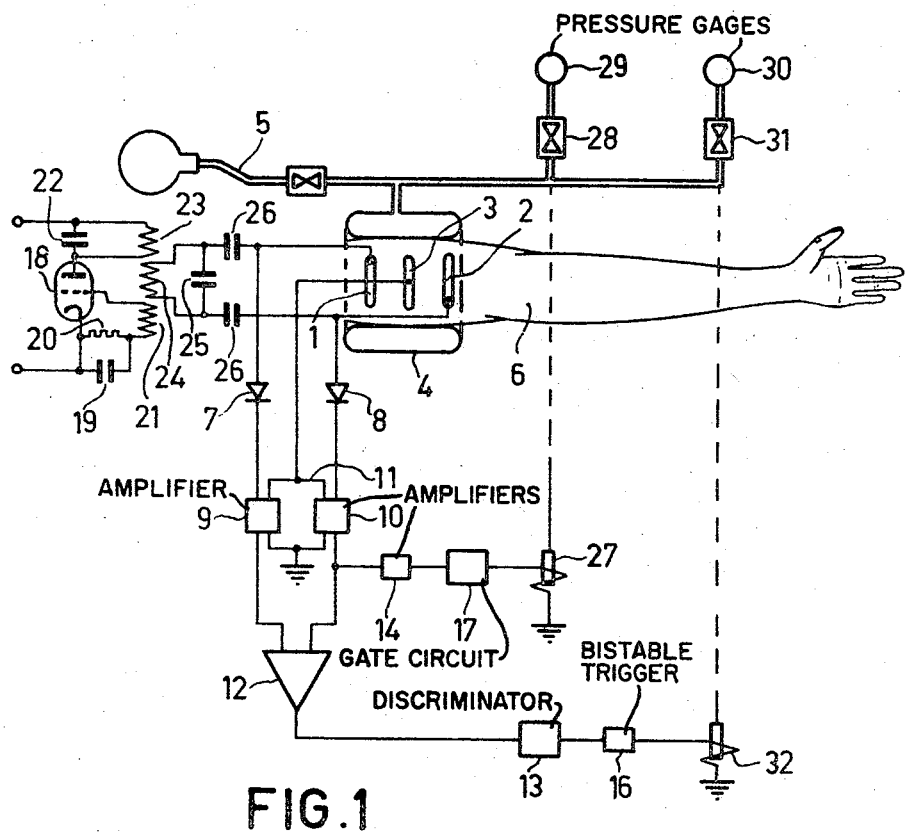
FIG.1
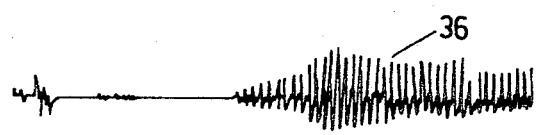
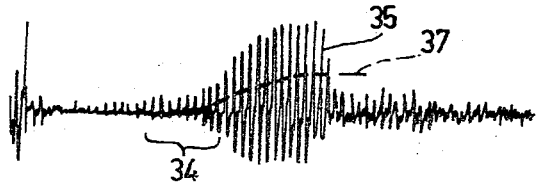
FIG.2
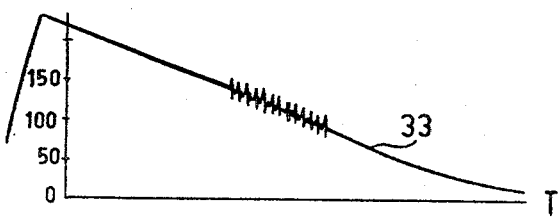
INVENTOR.
FRITS J. JANSSEN
BY
*Frank R. Trifari*
AGENT

DEVICE FOR MEASURING BLOOD PRESSURE

The present invention relates to a device for measuring blood pressure, and more particularly to an improved device for measuring the diastolic and systolic blood pressure in human beings. This type of device generally comprises an inflatable pressure cuff for exerting pressure on an artery. Use is made of certain variations in the electrical conductivity of the body tissue to electric current of high frequency as a result of variations occurring in the blood stream when the pressure in the pressure cuff gradually changes. Electrodes are provided for the supply of the electric current of high frequency between the pressure cuff and the part of the body enclosed by said cuff.

In such a device each wave of blood penetrating the vascular system situated beyond the pressure cuff causes an electric pulse. The blood pressure waves become noticeable as a modulation of the supplied alternating current between two electrodes adjoining the artery and spaced apart at a slight distance from each other. There is no circulation of blood when the pressure in the cuff is increased above the artery occlusion pressure. The cuff pressure is gradually decreased until a first electric pulse is produced when the systolic blood pressure is reached, the artery being opened only for a short instant to pass a slight stream of blood. Upon a further decrease of pressure, the intensity of the blood stream increases and is revealed by an increase in amplitude of the electric pulses. The pulse amplitude remains constant once the cuff pressure has decreased to such an extent that the flow of blood takes place regularly and is no longer hampered by stricture of an artery. The change from increasing to equal amplitude value is an unreliable criterion for measuring the diastolic pressure because the peak value of the amplitude does not suddenly remain constant when the cuff pressure equals the diastolic blood pressure, but still varies gradually over a number of heartbeats.

An object of the invention is to obviate this drawback. According to the invention a third electrode is provided between the two electrodes that supply the electric current of high frequency. The third electrode is connected with each of the outer electrodes to form a pair of current circuits that are coupled to the input of a difference amplifier directly, or by the interposition of additional amplifiers. The voltages generated in said circuits produce a measuring voltage in the difference amplifier mainly dependent on the mutual phase shift. The measuring voltage controls a threshold discriminator through a current circuit connected to said amplifier. The threshold voltage of said discriminator is variable dependent on the peak value of the supplied voltage and controls an operating current circuit for measuring the pressure in the cuff when the measuring voltage falls below the threshold voltage.

The blood has a higher specific conductivity than the body tissue so that the electrical impedance between electrodes placed one after the other varies with each wave of blood flowing through the arterial system. The location of the electrodes is chosen so that the amplitudes of the voltage pulses between each outer electrode and the central electrode are substantially equal to one another when the pressure cuff is not inflated.

A pressure cuff inflated above the systolic pressure completely occludes the circulation of blood as a result of the pressure exerted on the artery. Decrease of the cuff pressure to a value between the systolic and diastolic blood pressure allows the blood to flow through the locally narrowed artery. The flow time of the blood flowing through said part causes a delay of the wave of blood which first influences the resistance between the electrode on the inlet side, called the proximal electrode, and the central electrode and subsequently changes the resistance between said central electrode and the electrode on the outlet side, called the distal electrode. Consequently, the voltage pulses thus appearing show a phase difference. The phase difference rather suddenly disappears when the cuff pressure is decreased to a value at which the artery is just no longer closed.

Under the influence of an oncoming pressure wave of blood and with a given high pressure in the cuff substantially corresponding to the symbolic blood pressure, the closure of the artery is diminished to a very narrow area just sufficient to prevent the blood circulation. in order to avoid in this case that the resistance between the central electrode and the distal electrode is influenced, the central electrode is preferably provided alongside the center of the pressure cuff on the side remote from the inlet of the bloodstream. The outer electrodes are located at equal distances on either side of the central electrode.

In order that the invention may be readily carried into effect it will now be described in detail, by way of example, with reference to the accompanying diagrammatic drawing, in which:

FIG. 1 shows one embodiment of the device according to the invention mainly relating to the electric circuit; and FIG. 2 shows a few so-called rheographic registration diagrams.

The electrodes 1, 2 and 3 must be regarded as being provided against the outside of the inner tubular portion of the pressure cuff 4. Due to inflation of the cuff an airhose 5, the electrodes are tightly pressed against the part of the body 6 enclosed by the cuff. Of the outer electrodes the proximal electrode 1 is situated at the side on which the bloodstream enters the body part and the distal electrode 2 is situated on the outlet side. The electrode 3 is placed centrally between the two outer electrodes. The outer electrodes 1 and 2 are connected to a voltage source of high frequency via capacitors 26.

The pressure in the pressure cuff 4 is first increased to above the systolic pressure at which the bloodstream is shut off, and subsequently decreased. At the instant when the decreasing cuff pressure passes the systolic blood pressure the arterial flow of blood starts to move for just a moment at every heartbeat. The circulation is noticeable from the appearance of voltage pulses in the distal part of the current path between the outer electrodes 1 and 2, that is to say, in the part located between the central electrode 3 and the distal electrode 2. Previous blood pressure waves may already have caused voltage pulses in the proximal part of the current path, i.e., between the electrodes 1 and 3, if these pressure waves only partly penetrate under the cuff 4. Upon the occurrence of the first voltage pulse in the distal part, the cuff pressure is recorded and shows the systolic pressure.

When the pressure is further decreased the measuring signal is produced by comparison of the distal voltage pulses and the proximal voltage pulses and is dependent on the phase shift between the two voltages. To this end the proximal and the distal electrodes 1 and 2 are connected through the rectifiers 7 and 8 to the amplifiers 9 and 10 which have a common connection 11 to the central electrode 3. The output voltages are adjusted so that the amplitudes of the two voltages are equal to each other in the absence of any phase difference. The voltages are supplied to the difference amplifier 12 and cause voltage pulses at the output of the amplifier when the pressure in the pressure cuff 4 changes from the systolic to the diastolic pressure. A bistable trigger 16 may be operated by the voltage pulses if a predetermined value is exceeded. It can be achieved in known manner that the voltage pulses influence the trigger upon exceeding a value which is adjusted by using a floating discriminator 13, the threshold value of which is a fixed percentage of the maximum amplitude reached. The choice of the threshold percentage makes it possible to match the value of the cuff pressure at which the peak voltages from the differential amplifier cease to influence the discriminator and which cuff pressure represents the diastolic pressure, to the various subjective diastolic criteria which a conventional in normal auscultation.

The device operates as follows. After pressure cuff 4 is placed about the patient's arm, it is inflated to such a pressure that the artery is shut off. After inflation the air escapes from the cuff so that the pressure gradually decreases preferably at a constant reduction of a few millimeters of mercury per second. The cuff pressure follows as a function of time the course of the graph 33 in FIG. 2.

When the pressure in the cuff has decreased to such a value that during the maximum pressure caused by the heartbeat the blood penetrates under the cuff up to beyond the first proximal electrode 1, the proximal part of the impedance is already influenced so that pulses are produced in the difference amplifier such as are indicated in the portion 34 of the registration diagram 35 of FIG. 2. These pulses, however, do not provide a correct indication. Only when the artery is opened so far that a wave of blood is passed through, does the cuff pressure correspond to the systolic value to be measured. The registration thereof is effected with the aid of the amplifier 10 which receives the distal voltage waves. The output of amplifier 10 is a tapped off to an output amplifier 14. The first voltage pulse originating therefrom is characteristic of the systolic blood pressure. In response to the first pulse, a gating circuit 17 is opened and the electromagnetic relay 27 is energized. Relay 27 in turn closes a valve 28 in the conduit between the pressure gauge 29 and the airhose 5. The systolic pressure can thus be read. The distal voltage pulses are shown in the registration diagram 36 of FIG. 2.

During the next time interval the artery is opened and subsequently closed again during each period of a heartbeat. It has been found that when using an alternating current source, which supplies a few ma. at 100 kc., impedance variations can be measured the differences of which modulate the high-frequency current as a result of the phase shift caused by the delay in the wave of blood. A generator having an oscillator tube 18 serves as a current source. A capacitor 19, a resistor 20 and a coil 21 are connected in the grid circuit of the tube 18 and the anode circuit includes the capacitor 22 and a coil 23. The grid coil 21 and the anode coil 23 are connected together and to the secondary coil 24, the last-mentioned coil and the capacitor 25 being tuned in resonance with the generator frequency. The high-frequency energy is supplied through the separation capacitors 26 to the current circuit of the electrodes 1 and 2. In case of symmetrical adaptation of the amplifiers 9 and 10 the generated voltage does not penetrate to beyond the difference amplifier 12.

The phase modulation results in peak voltages at the output of the difference amplifier 12 upon the occurence of each heartbeat according to the registration diagram 35. The threshold voltage 37 of the discriminator 13 is adjusted to a certain percentage of the maximum amplitude of the input voltage to insure that voltage pulses exceeding the threshold voltage are passed.

When the pressure in the cuff has decreased to such a value that the artery does not close anymore after each heartbeat, the phase difference and also the voltage pulses substantially entirely disappear from the differential amplifier 12. After decreasing to the threshold voltage of the discriminator 13, the pressure gauge 30 shows the diastolic pressure. The diagrammatic illustration of the electronic means used in the invention shows that only known components are utilized. A floating discriminator is to be understood to mean a circuit in which a threshold voltage is produced which amounts to a certain percentage of the maximum amplitude of a signal supplied. By comparison of the supplied signal, the amplitude of which decreases after reaching a maximum value, with the threshold voltage, a subsequent stage may be actuated at the instant when the signal no longer exceeds said voltage, for example, a gating circuit 16 which is stable in two positions and to which an electromagnetic relay 32 is connected, The relay in turn operates a valve 31 in the pressure conduit.

I claim:

1. A device for measuring blood pressure comprising, an inflatable cuff adapted to be pressed against a body surface over an artery, means for indicating the pressure in said cuff, first and second electrodes adapted to be spaced apart on the part of the body covered by said cuff, a third electrode adapted to be placed on said body part between the first and second electrodes, means for supplying a high-frequency electric current to said first and second electrodes, a difference amplifier, means connecting said first and third electrodes and said second and third electrodes to the input of said difference amplifier to form first and second current circuits, respectively, voltages being generated in said current circuits to produce a measuring voltage in the difference amplifier that is mainly dependent upon the mutual phase shift between said voltages means for coupling sad measuring voltage to a threshold discriminator having a variable threshold voltage that is dependent on the peak value of the voltage supplied thereto and means controlled by said discriminator for actuating said pressure-indicating means when the measuring voltage falls below the threshold voltage.

2. A device as claimed in claim 1, characterized in that the central electrode is provided wherein the third electrode is centrally disposed between the first and second electrodes under the cuff alongside the center of the cuff, at least beyond the position of the largest depression, on the side remote from the inlet of the bloodstream.

3. A device as claimed in claim 1 herein said electrodes are adapted to be in substantial alignment with the artery so that said second electrode forms the distal electrode, said pressure indicating means including first and second pressure gauges adapted to indicate the diastolic pressure and the systolic pressure, respectively, means for inflating said cuff to a pressure which will occlude the artery and thereafter gradually reducing the cuff pressure, and means coupled to the output of the distal electrode for operating said second pressure gauge upon receipt of the first voltage pulse to occur in the distal electrode after occlusion of the artery, said actuating means being arranged to operate said first pressure gauge.

4. A device as claimed in claim 3 wherein said operating means comprises a gate circuit coupled to said distal electrode and a relay coupled to the output of the gate circuit, and said actuating means comprises a bistable trigger device coupled to the output of the discriminator and a second relay coupled to the output of said bistable device.

5. A device as claimed in claim 1 wherein said high-frequency current supply means comprises an oscillator operating at approximately 100kHz., said device further comprising first and second diodes connected between said first and second electrodes, respectively, and the input of said difference amplifier.

6. A device for measuring blood pressure comprising, first, second and third electrodes adapted to be spaced apart on a body surface in alignment with an artery, an inflatable pressure cuff adapted to enclose said electrodes and press against the surface over the artery, pressure-indicating means connected to said cuff, means for inflating the cuff above the artery occlusion pressure and thereafter gradually reducing the cuff pressure, a source of high-frequency electric energy coupled across said first and second electrodes, means coupled to said electrodes for comparing the voltage pulses generated between said first and third electrodes with the voltage pulses generated between said second and third electrodes to produce a control voltage that is determined by the phase difference between said voltage pulses, means for actuating said pressure-indicating means, and a threshold device coupled between the output of said comparing means and the input of said actuating means for triggering said actuating means when the phase difference between said voltage pulses decreases below a given value.

7. A device as claimed in claim 6 wherein said threshold device comprises a discriminator having a threshold voltage that can be set to a given diagram percentage of the maximum amplitude of the input voltage supplied thereto.